Sept. 29, 1964 L. HUBER 3,150,656
HEATER
Filed Jan. 19, 1962 2 Sheets-Sheet 1

INVENTOR:
LUDWIG HUBER
By McGlew and Toren
Attorney

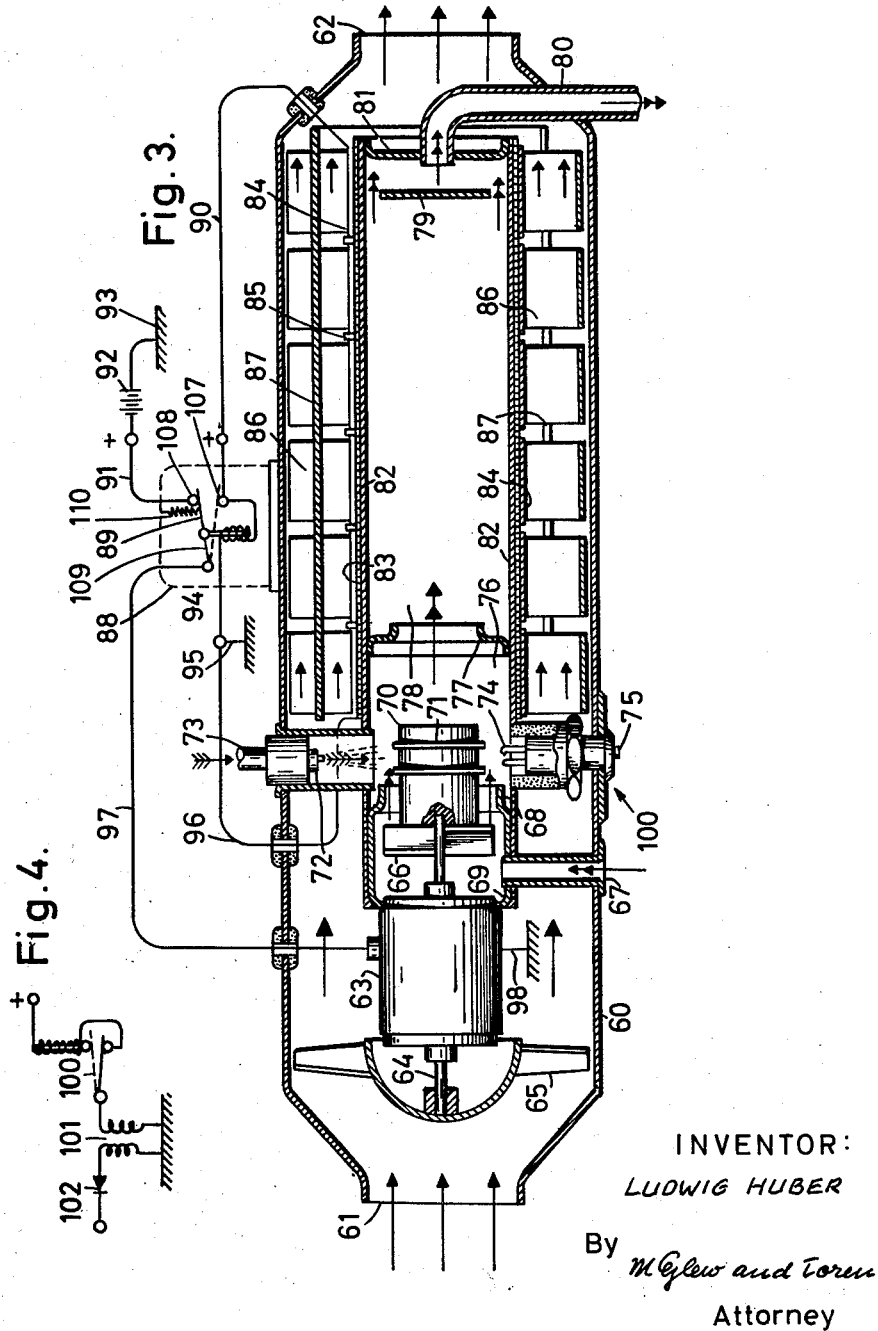

United States Patent Office 3,150,656
Patented Sept. 29, 1964

3,150,656
HEATER
Ludwig Huber, Saarlandstrasse 15, Stuttgart-
Mohringen, Germany
Filed Jan. 19, 1962, Ser. No. 167,396
Claims priority, application Germany Jan. 27, 1961
6 Claims. (Cl. 126—110)

My invention generally relates to heating devices and is particularly directed to heaters for use in vehicles such as motor cars.

A variety of motor car heater constructions are available on the market. In some instances, the heater constitutes any independent unit which is mounted at a suitable location within the motor car while the energy necessary for performing at least some of the functions which are required for the operation of the heater is supplied by the electric power source of the motor car, i.e. the battery. Thus, in several heater constructions which have found acceptance by the industry and the public, the heater proper includes an independent combustion system and an electric motor which is supplied by the car battery and which in turn drives one or several fans or blowers for drawing combustion air into a combustion chamber and for causing the circulation of air or the like medium to be heated past and around the combustion chamber. In some heater constructions, the fuel supply to the heater combustion chamber is also dependent on the car battery which supplies power to an electrically operated fuel pump. Again, the energy for the ignition of the fuel-air mixture in the heater combustion chamber by a spark plug is usually supplied by the car battery.

While it is, of course, convenient to tie in the operation of the heater with the car battery, it will be realized that such an arangement has certain drawbacks. The heater of a car is primarily used during cold weather at which time the car battery has its lowest capacity. Therefore, as is well known, the heater generally can only be operated when the car engine is running and thus charges the car battery, as otherwise the electric energy consumed by the heater wiuld soon drain and discharge the battery until it is "dead." This, of course, constitutes an important disadvantage. For example, if the driver of a motor car parks his car during cold weather while going on an errand, he would, of course, like to return to a car which in the meantime has been heated. This, however, he cannot do as operation of the heater during his absence might drain the battery to such an extent that he would not be able to start the car after his return.

Accordingly, it is a primary object of my invention to provide a heating system for vehicles and in particular for motor cars which may be operated any length of time without discharging the motor car battery.

Another object of my invention is to provide an improved vehicle heater construction.

Generally, it is an object of my invention to improve on the art of heating vehicles as presently practiced.

My invention makes use of the principles and phenomena of thermo-electricity. As is known, whenever two dissimilar metallic conductors come into contact at one end, a difference of electric potential occurs. If the other ends of the conductors are joined and the two junctions are maintained at different temperatures, an electric current is produced in the circuit thus formed. By joining a plurality of such conductor pairs, usually referred to as thermoelements or thermocouples, in series and by establishing heat exchange between one of the ends of each thermocouple and the hot combustion chamber wall of the heater, I obtain a cumulative electromotive force which I may tap by lead wires at either end of the thermocouple series or pile. The electromotive force is increased by cooling the other end of the thermocouples.

Briefly, therefore, my invention provides for arranging a plurality of thermoelements in series on the outer surface of the heater combustion chamber and/or the gas discharge line to produce an electric current of a magnitude sufficient to replace the car battery as an electric energy source and thus to operate the electric motor or motors of the heater. As in the prior art constructions, I start up the heater by supplying electric energy or current from the car battery. However, once the heater has been heated to a predetermined temperature value, sufficient thermoelectric current will be generated by the thermoelements so as to take over the function of the battery. For this purpose, I provide for switch means which, during the start-up of the heater, connect the car battery to the electric motor of the heater while, once sufficient thermoelectric current is produced, the switch is switched over to disconnect the battery and to supply the motor with the thermoelectric current. The switching from the battery current to the thermoelectric current may be accomplished manually or automatically by providing suitable relay means.

According to a further feature of my invention, I utilize the thermoelements referred to not only as a means for producing electric energy, but also as a heat exchange means for facilitating the heat transfer between the hot combustion chamber walls and the medium, e.g. air to be heated. As the thermoelements during operation of the heater are strongly heated, I arrange these elements in the path of the air flow washing around and past the combustion chamber thereby causing effective heating. This heat exchange in turn increases the thermoelectric energy produced, as the temperature differential between the heat junction of the thermoelements at the combustion chamber walls and the cold junction at the opposite end of the thermoelements will thus be greater than if no heat exchange between ambient gas flow and the thermoelements would take place.

In most cases, the potential of the thermoelectric current produced by the thermoelements can be arranged to be of about the same magnitude as that of the current supplied by the car battery, that is, about 6 volts as is customary in car batteries. Minor variations or fluctuations in the voltage are not of great importance as most electric motors can be operated at varying voltages. However, some vehicle batteries have a higher voltage, such as 24 volts, and in that event I provide means for either stepping up the potential of the thermoelectric current or for reducing the battery potential. Various means are known in the art to accomplish such a result. Thus, for example, the battery voltage may be stepped down by a resistance or the direct current obtained by the thermoelements may be chopped up by the interposition of a circuit interrupter to get a fluctuating unidirectional curent. This voltage of this current may be then stepped up by a transformer to the desired voltage value, whereafter the fluctuating current may again be rectified unless a motor is used which may be operated by either D.C. or A.C. current.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of my invention.

In the drawings:

FIG. 3 is an axial section through a heater for a motor vehicle which may selectively be operated by either the car battery or by the thermocurrent; and FIG. 4 shows a circuit diagram.

Figure 1:
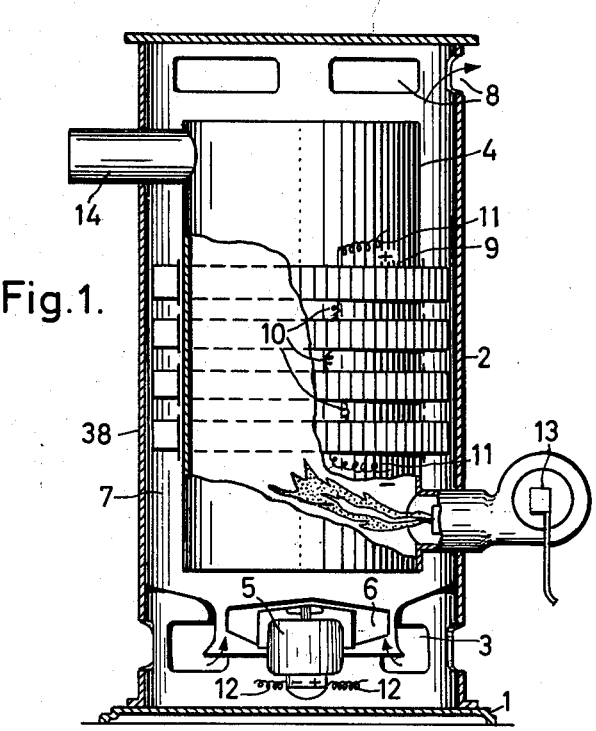
FIG. 1 is a somewhat diagrammatic representation in axial section of a furnace-like heater to be used for the heating of a vehicle.

Referring now to the drawings, and in particular to FIG. 1, it will be noted that the heater comprises a base portion 1 which may be placed or mounted on a suitable surface of a vehicle such as a motor car. The heater proper comprises a cylindrical jacket 2 which has a number of openings 3 for drawing in air to be heated. The jacket 2 surrounds the combustion chamber or fire box 4. An electric motor 5 is arranged in the lower region of the space defined by jacket 2 and drives an axial fan or blower 6 which draws in air through the openings 3 as shown by arrows A. The air then passes through the annular space 7 defined by the jacket 2 and the combustion chamber 4. The air leaves the heater through the exit openings 8 provided in the upper portion of the jacket 2. The purpose of the heater is, of course, to heat the air passing through the annular space 7 which air in turn is intended to heat desired locations of the motor car.

Four rings 9 of a plurality of thermoelements or couples 9 are arranged on the outer surface 30 of the cylindrical combustion chamber 4. The rings are split and the end of each ring is electrically connected by conductors or wires 10 to the beginning of the adjacent ring. The terminals 11 which respectively are designated by + and — may be connected (not shown) to the terminals of the electromotor 5 as will be explained in greater detail in connection with FIG. 3.

The manner of heating the combustion chamber does not directly form part of this invention and may be accomplished in any desired manner. Thus, the combustion chamber may be charged with solid, liquid, powderous or gaseous fuels. However, in order to facilitate the understanding of the construction shown, an oil burner 13 has been indicated. The oil burner is electrically operated and for this purpose, it may be electrically connected to the line 11 (not shown). The combustion gases exit from the combustion chamber through the line 14 as indicated on top of FIG. 1.

As one end of each thermocouple of the thermocouple rings 9 is in heat exchange contact with the combustion chamber outer wall and this end thus constitutes the "hot" junction for the thermocouple, while the opposite or "cold" end of the thermocouple is effectively cooled by the air flowing through the annular space 7, a significant temperature differential between the opposite ends of the thermocouples is obtained which results in a considerable potential. As the thermoelements are connected in series, a cumulative electromotive force is obtained.

As will be noted, the thermoelements do not only serve the purpose of producing a thermocurrent, but also facilitate the heat transfer from the combustion chamber wall to the ambient air in space 7. This in turn results in cooling of the thermoelements and a higher temperature differential and thus greater voltage produced by the thermoelements. As the heat exchanging thermoelements generally extend in the flow direction of the air, the air flow through the space 7 will take place at considerable speed and is not significantaly obstructed.

As previously mentioned, the thermocurrent produced by the thermoelement rings 9 may be fed to the electromotor 5 which in turn supplies the energy for the fan 6. The fuel injecting means 13 may also be operated by the thermocurrent. However, in order to start up the motor 5, an additional connection to the car battery (not shown) is provided as will be explained in detail in connection with FIG. 3.

Assuming that the car battery produces 6 volts as is customary, it is advantageous to generate a thermocurrent of about the same voltage potential. I have established that for this purpose, I need about 1000 thermocouples so that in accordance with the embodiment shown in FIG. 1, each of the rings 9 contains about 250 thermoelements each. As the thermoelements have a twin action, that is, they produce the thermoelectric current and also act as heat exchangers, the inventive device can be built and operated in economic manner.

Figure 2:
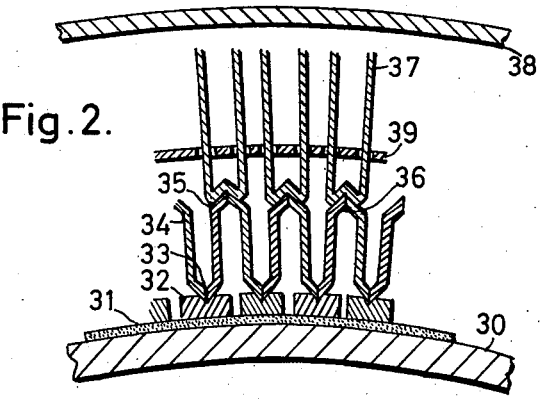
FIG. 2 is an enlarged fragmentary sectional view showing the arrangement and construction of the thermoelement series or pile.

FIG. 2 is a detail view of a preferred construction and arrangement of the thermoelements. It will be noted that the combustion chamber wall 30 is covered with an insulating layer 31 which may consist of, for example, mica, enamel or the like. Heat conducting ledges or members 32 are in turn mounted on the insulating layer 31. These ledges 32 may consist of, for example, copper as this material has excellent heat conducting qualities. While the individual heat conducting ledges 32 are spaced from each other so as to accomplish electric insulation between the individual ledges, it will be realized that the distances between the individual ledges should be as small as possible both in the circumferential direction and also with regard to their parallelity so as not unduly to impair the heat transfer from the hot wall surface 30 to the ledges 32 and to minimize the direct heating of the air by contact with the hot combustion chamber wall. By closely spacing the individual ledges, the major amount of the heat from the combustion chamber is first transferred from there to the thermoelements 34, 35 and only thereafter the heat is dissipated from the latter to the air flow, as is desired. The close spacing of the ledges is also important in order to obtain the maximum amount of temperature differential between the hot junctions 33 of the thermocouples and the cold junctions 36. The electrical insulation layer 31 is only coated on those portions of the wall 30 of the combustion chamber where the thermoelements are to be mounted so that efficient heat exchange between the hot gases in the combustion chamber and the air to be heated in the external space 7 (FIG. 1) can take place.

The ledges 32 have shallow grooves for receiving the lower ends of the thermocouples 34, 35. This contact area of the thermoelements 34, 35 thus constitutes the hot junction. The thermoelements may, of course, consist of any suitable metal combination as customarily used in this art. In the embodiment shown, my thermoelements consist of iron (as indicated by reference numeral 34) and constantan (as indicated at 35). Recently, semi-conductors have been introduced for use as thermoelements and, of course, these may be employed. The cross-sectional areas of the thermoelements should be relatively larger in order to minimize electric resistance. Generally speaking, I prefer to adapt the cross-sectional areas of the thermoelements to the electrical conductivity so that the resistance of the conductors 34 and 35 are about equal. It will also be noted that the individual thermoelements are angled off in the region of their connecting areas 33 and 36. Thus, the individual thermoelements are shaped at the connecting areas in such a manner that they form a free flow passage through which the air flow in the annular space 7 can freely pass and wash around. This, of course, again increases the heat exchange effect between the hot thermoelements and the air to be heated.

With a view to still further increasing the heat exchange effect, I provide further heat conducting members 37 having a lower portion which is complementarily shaped to the junction zone 36 of the thermoelements. These heat exchanging members 37 which have generally a W shape thus are in heat exchange contact with the cold junction area 36 of the individual thermoelements. These elements 37 again may consist of copper or a similar heat conducting material. It will be noted that these members 37 extend almost to the outer wall 38 of the heater jacket. If it is desired to heat the air within the space 7 to a relatively high temperature value, then the region in the vicinity of the outer jacket 38 is of no importance with regard to heat transfer because only relatively small amounts of heat reach this region. In such event, however, it is desirable to employ an air guiding or separating plate 39 as shown in FIG. 2 which separates the inner region of the heater, that is, the region between the plate 39 and the outer wall 30 of the combustion chamber from the outer region, which is the region between the plate 39 and the outer jacket 38. If such separating or guide plate 39 is employed, then the air supplied through the inlet openings 3 may only flow through the inner region while a second cooling air flow passes through the outer region. In another embodiment of my invention this second cooling air flow, which to a certain extent is heated by heat exchange with the members 37, may subsequently be conducted through the inner region so that the heat which has been dissipated from the free ends of the members 37 is effectively utilized. The arrangement of the separating plate 39 has the additional advantage that the hot junction areas 33 are not excessively cooled by the inner air flow while the cold junction areas 36 due to the provision of the heat exchange members 37 are cooled more efficiently.

Referring now to the embodiment of FIG. 3, it will be noted that the construction illustrated in this figure represents a car heater generally indicated by reference numeral 100. The car heater has a cylindrical jacket 60 which defines an inlet opening 61 for drawing in air to be heated, and an air exit opening 62 at the opposite end. The air is conducted from the exit opening 62 in any desired manner, for example to heat the interior of a motor car or the like. A D.C. motor 63 is axially arranged within the space of jacket 60. The mounting means for the motor have not been shown in detail as they do not form part of this invention. The D.C. motor 63 has a shaft 64 to which on the inlet side is keyed a fan 65 for drawing in air through opening 61 while on the other side a second fan 66 is arranged for drawing in combustion air. The fan 66 draws the combustion air through the inlet pipe 67 into the air chamber 69. The air chamber 69 has a constricted outlet opening 68 through which the combustion air reaches the pre-cumbustion chamber 76. The fan 66 has a drum portion 70 projecting into the pre-combustion chamber 76. The drum 70 co-rotates with the fan 66 and has two disintegrating or atomizing ribs 71. A fuel injection nozzle 72 injects fuel into the region defined by the two ribs 71. The fuel is conducted to the nozzle 72 through the line 73 which in turn is supplied by an electrically operated fuel pump which is electrically driven in similar manner as motor 63. The fuel-air mixture is ignited by the spark plug 74 which, as shown at 75, is connected to the igniting means of the vehicle. The ignition of the fuel and air mixture takes place in a pre-combustion chamber 76. This pre-combustion chamber 76 communicates through an annular member 77 with the combustion or heating chamber 78. The combustion gases formed in the heating chamber 78 wash around the baffle plate 79 arranged within the chamber and exit through the line 80. Line 80 is secured to an end plate 81. The combustion chambers 76 and 78 are otherwise defined by the walls 82. The air drawn in by the fan 64 through the inlet opening 61 cools the motor 63 and then enters the annular space defined by the combustion chamber walls 82 and the outer jacket 60. The combustion chamber walls 82 are coated with an insulating layer 83 of mica, or the like, in the same manner as described in connection with FIG. 1. Heat conducting ledges 84 corresponding to the ledges 32 of FIG. 2 are provided on the insulating layer 83. A plurality of thermoelements 86 are arranged about the combustion chamber walls 82 in a manner analogous to that described in connection with FIGS. 1 and 2. In the upper half of FIG. 3, the section shown traverses the ends of the annular thermoelement chains or rings, and the short wire connections 85 which accomplish the in-series connection of the individual thermoelement chains or rings will be noted. The thermoelements 86 extend in radial and axial parallel direction through the annular space between the jacket 60 and the combustion chamber walls 82. The hot junctions are again situated on the heat conducting ledges 84 while the cold junctions which can be seen in the lower half of FIG. 4 in section reach almost to the jacket 60. As in the embodiment of FIG. 2, heat exchanging members may be in heat exchanging contact with the cold junctions, although this has not been shown in this embodiment. However, as in the embodiment of FIG. 2, an air guiding member or plate 87 is illustrated which separates the air flow into an inner and an outer region.

In accordance with the invention, the motor 63 and the fuel supply pump (not shown) may selectively receive its electric energy either from the battery 92 of the motor car or from the thermocurrent generated by the thermoelements. For this purpose, the following arrangement is made: A relay or switch 89 is provided in a casing 88 shown in dash lines. The positive thermoelement potential is supplied to the relay via line 90. The relay, however, is also connected to the positive pole of the battery through line 91 while the negative pole of the battery is grounded at 93. Line 97 connects the switch arm 109 of the relay to the motor 63 whose other terminal is grounded as shown at 98. The winding 94 of the solenoid of the relay 89 is connected with the negative pole of the thermochain through line 96 which is grounded at 95. The winding 94 of the solenoid has a relatively high resistance. The arrangement operates as follows: When the heater is to be started, current will be supplied from the car battery 92 through line 91, switch arm 109 and line 97 to the motor 63. This in turn will result in the operation of the motor and air will be drawn in through inlet opening 61 by the action of the fan 65. At the same time, combustion air is drawn by the fan 66 through pipe 67 and fuel is injected through line 73 and nozzle 72. The fuel-air mixture is ignited by the spark plug 74 and the combustion chamber walls 82 are thus heated. The hot junctions of the thermoelements are thus heated as well while the cold junctions are continuously cooled by the air flowing past the combustion chamber walls through the space defined by elements 81 and 60. This effect is additionally increased by the provision of the heat exchanging members described. Thus, a thermocurrent is produced which is fed to the relay 89. When the thermocurrent has reached a potential of predetermined value, e.g. when it is about the same as that generated by the battery, switch arm 109, due to the action of the solenoid, is moved from the back contact 108 to the front contact 108 as seen in dash lines. Thus, the motor 63 and also the fuel supply motor are now supplied by the thermocurernt. The switch arm 108 is biased upwardly by a spring 110 as is customary in this type of relay. It will be realized, of course, that the switching over from battery operation to thermocurrent operation can be effected manually and that many prior art relays and the like switching devices may be used for this purpose.

As previously mentioned, some motor car batteries generate a higher potential than 6 volts and in such cases it would be impractical to produce a thermocurrent of the same potential, as the number of thermoelements required for this purpose would be exceedingly larger. Therefore, in instances in which the thermocurrent has a lower voltage than the battery current, I provide means either for causing a voltage drop of the battery current or for stepping up the thermocurrent potential to a value which approximates that of the battery current. Again, many prior art devices and means are known for accomplishing such a result. As an example of the latter alternative, however, I refer to the circuit shown in FIG. 4 which illustrates switching elements which may be interpositioned between the line 90 and the relay or change-over switch 89. The D.C. thermocurrent flowing through line 90 is converted by element 100 into a fluctuating interrupted D.C. current. Element 100 may thus consist of a so-called Wagner hammer. The fluctuating D.C. current potential thus obtained is then stepped up by the transformer 101. One end of each winding of the transformer 101 is grounded as indicated in FIG. 4. The thus stepped up current is then rectified to ordinary D.C. current again by the provision of the rectifier 102. This, of ocurse, may not be necessary if a universal motor 63 is used. Of course, it will be realized that other means may be employed to chop up the direct thermocurrent by the provision of circuit interrupters to get a fluctuating unidirectional current which is then stepped up by a transformer and, if necessary, again rectified.

While a specific embodiment of the invention has been shown and described in detail to illustrate the application of the inventive principles, it will be understood that the invention may be embodied otherwise without departing from such principles. Thus, for example, while the invention has primarily been described in connection with motor cars, it will be realized that it can be embodied in other vehicles or vessels.

What is claimed is:

1. In combination, a wall-enclosed chamber adapted to confine the combustion of a fuel-air mixture introduced thereinto and having a port therein for enabling exhaustion of the combusted mixture therefrom, a layer of electrical insulation material covering the outer wall enclosure of said chamber, a plurality of serially connected thermoelements, each thermoelement having a junction to be heated and a junction to be cooled, each of said junctions to be heated being in contact with said layer of insulation material and in heat transfer relationship with said wall enclosure, each said junction to be cooled being at an extremity of its respective thermoelement and remotely situated from said insulation layer and said wall enclosure, a separating wall spaced apart from said layer of insulation and situated between said junctions to be heated and said junctions to be cooled, the separating wall defining a first flow passage between said insulation layer and said separating wall and a second flow passage between said junction to be cooled and said separating wall, and means for causing air to flow through said first and second flow passages so that said flowing air comes into contact with said thermoelements including the junctions thereof.

2. The combination, according to claim 1, wherein said means for causing air to flow is comprised of a fan arranged near an end of said wall enclosed chamber, opposite said port and said separating wall, for introducing air into said first and second flow passages.

3. In combination, a wall enclosed combustion chamber having a port therein for enabling the exhaustion of combusted gases therefrom, a layer of electrical insulation material covering the outer wall enclosure of said chamber, a plurality of serially connected thermoelements, each thermoelement having a junction to be heated and a junction to be cooled, each of said junctions to be heated being in contact with said layer of insulation material and in heat transfer relationship with said wall enclosure, each said junction to be cooled being at an extremity of a respective thermoelement and remotely situated from said insulation layer and said wall enclosure, a separating wall spaced apart from said layer of insulation and situated between said junction to be heated and said junction to be cooled, said separating wall defining a first flow passage between said insulation layer and said separating wall and a second flow passage between said junctions to be cooled and said separating wall, electrically driven fan means for passing air through said first and second flow passages whereby said flowing air comes into contact with said thermoelements including the junctions thereof, electrically driven means associated with said chamber for introducing a fuel-air mixture thereinto for combustion therewithin, means within said chamber electrically driven from therewithout, for compressing the fuel-air mixture prior to combustion, and circuit means coupled with said thermoelements for translating the thermoelectric power developed by said thermoelements to said electrically driven fan means, said electrically driven fuel-air introducing means and said externally situated electrical means for operating said compression means.

4. The combination, according to claim 1, further comprising a plurality of heat conducting elements, one for each thermoelement, each said heat conducting element extending outwardly from the junction to be cooled of its respective thermoelement in a direction away from said insulation layer and said wall enclosed chamber, said heat conducting element being subjected to the flowing air in said second flow passage.

5. The combination, according to claim 1, further comprising additional heat conduction elements situated between and in abutment with said junctions to be heated and said layer of insulation.

6. The combination, according to claim 1, further comprising an additional wall situated near all said junctions to be cooled, and extending parallel with said separating wall, said second flow passage being defined between said additional wall and said separating wall.

References Cited in the file of this patent

UNITED STATES PATENTS

| | | |
|---|---|---|
| 483,782 | Giraud | Oct. 4, 1892 |
| 851,799 | Churchward | Apr. 30, 1907 |
| 1,118,269 | Creveling | Nov. 24, 1914 |
| 2,015,610 | Underwood | Sept. 24, 1935 |
| 2,225,700 | Laing | Dec. 24, 1940 |
| 2,269,337 | Dulaney | Jan. 6, 1942 |
| 2,362,259 | Findley | Nov. 7, 1944 |
| 2,390,578 | Findley | Dec. 11, 1945 |
| 2,757,662 | Baier et al. | Aug. 7, 1956 |
| 2,980,841 | Bearinger et al. | Apr. 18, 1961 |

FOREIGN PATENTS

| | | |
|---|---|---|
| 17,493 | Great Britain | 1893 |